Figure 3:
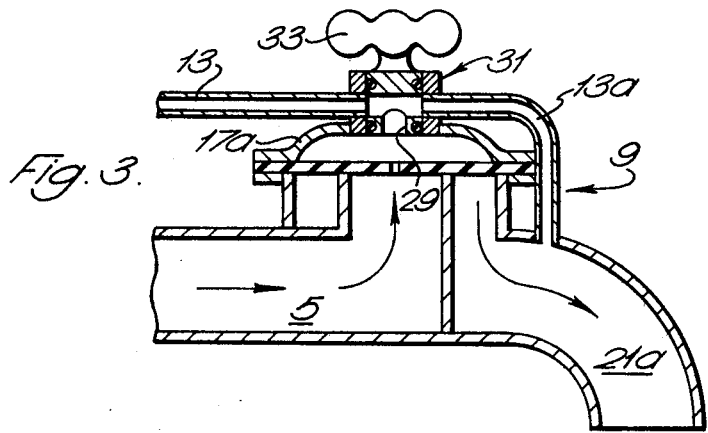

United States Patent
Gledhill

[11] 3,722,520
[45] Mar. 27, 1973

[54] APPARATUS FOR AND METHOD OF CONTROLLING FLOW OF FLUIDS IN A PIPELINE

[75] Inventor: Eric Guy Brian Gledhill, Sutton, England

[73] Assignee: F. W. Talbot & Company Limited, Winchester, England

[22] Filed: Feb. 3, 1971

[21] Appl. No.: 112,271

[30] Foreign Application Priority Data

Feb. 10, 1970 Great Britain.......................6411/70

[52] U.S. Cl. ..........................137/1, 137/608, 251/41
[51] Int. Cl................................................F17d 1/00
[58] Field of Search ...137/608, 637, 614.11; 251/41, 251/45, 46, 57

[56] References Cited

UNITED STATES PATENTS

| | | | |
|---|---|---|---|
| 1,648,126 | 11/1927 | Hosmer | 251/41 X |
| 3,372,899 | 3/1968 | McPherson | 251/46 X |
| 3,158,174 | 11/1964 | Stalnecker et al. | 137/614.11 X |
| 3,519,022 | 7/1970 | Chung et al. | 251/46 X |
| 2,109,958 | 3/1938 | Finley et al. | 251/41 |
| 2,853,268 | 9/1958 | Hughes | 137/505.22 X |
| 3,143,142 | 8/1964 | Okaniwa et al. | 137/637 X |
| 3,263,577 | 8/1966 | Hiller | 137/236 X |
| 3,275,032 | 9/1966 | Gruller | 137/608 |
| 3,367,355 | 2/1968 | Anderson | 251/57 X |
| 3,467,129 | 9/1969 | Gratzmuller | 251/57 X |

*Primary Examiner*—Samuel Scott
*Attorney*—Baldwin, Wight & Brown

[57] ABSTRACT

A method and apparatus for controlling the flow of fluid in a supply pipe to a premises such as a water supply pipe or a gas supply pipe in which a small bore high pressure tubing is provided preferably alongside the standard supply pipe and communicates between a main stopcock arranged to control the flow of fluid from a water or gas supply into the premises supply pipe and the various control valves in the premises, the main stopcock and the control valves each preferably being provided with an apertured diaphragm providing the only means of communication between the small bore tubing and the supply pipe whereby, when one of the control valves is opened, pressure is released in the small bore tubing to lift the diaphragm off the seat of the main stop cock to permit flow of fluid through the main stop cock into the supply pipe and vice versa. It is envisaged that instead of relying upon pressure signals to open and close the main stopcock electrical signals could be used. Clearly, by fitting such apparatus into a domestic water or gas supply, water or gas will only flow into the domestic system through the main stopcock when required thereby preventing wastage of water or gas in the event of a leak in the pipeline between the main stopcock and the premises.

16 Claims, 13 Drawing Figures

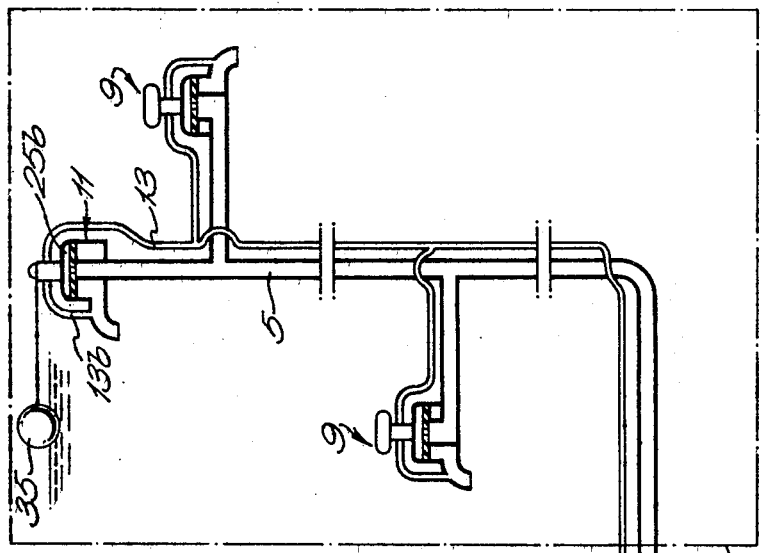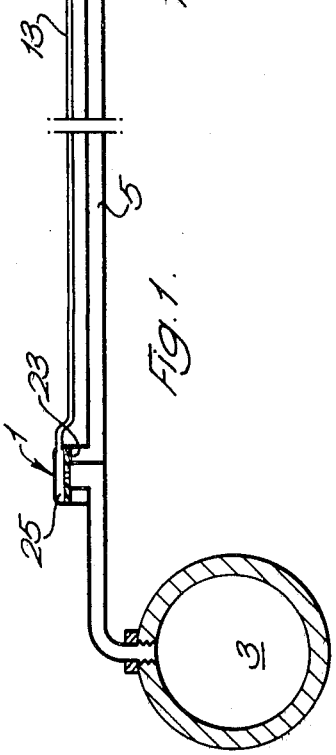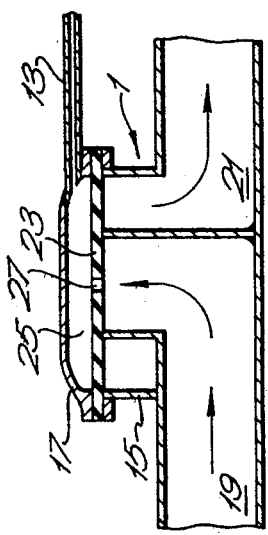

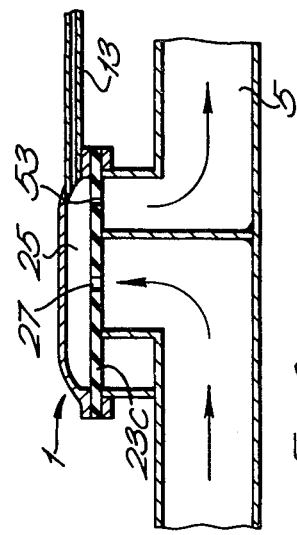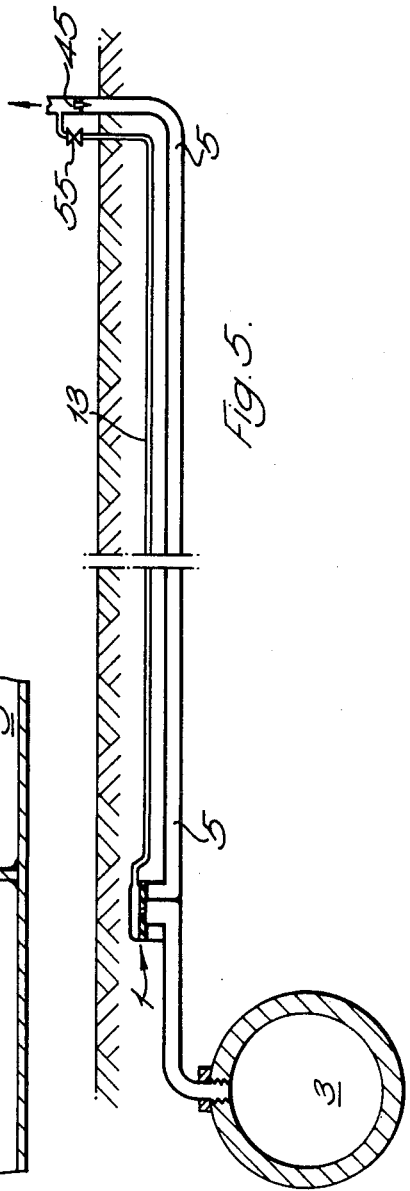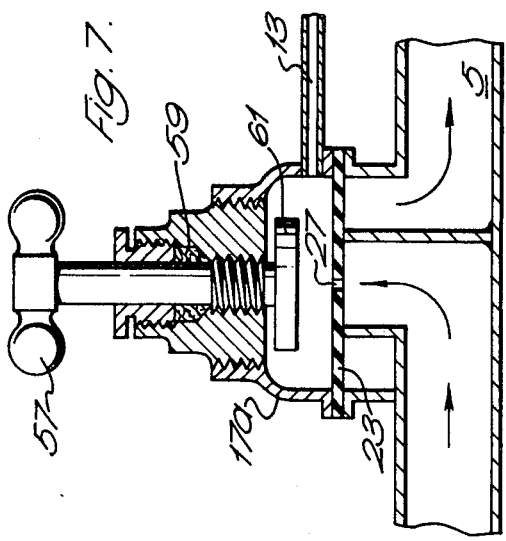

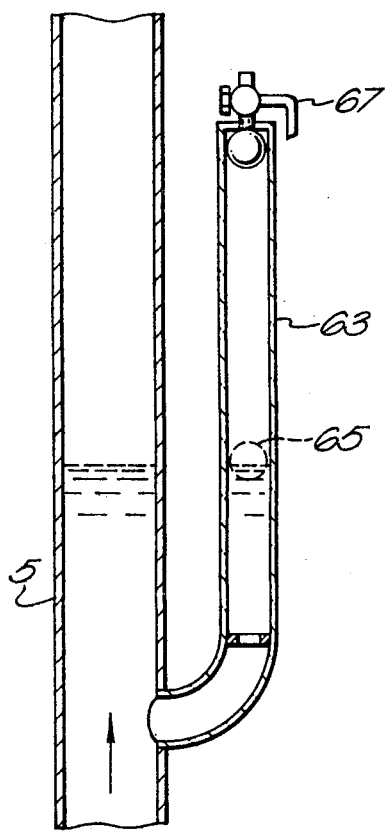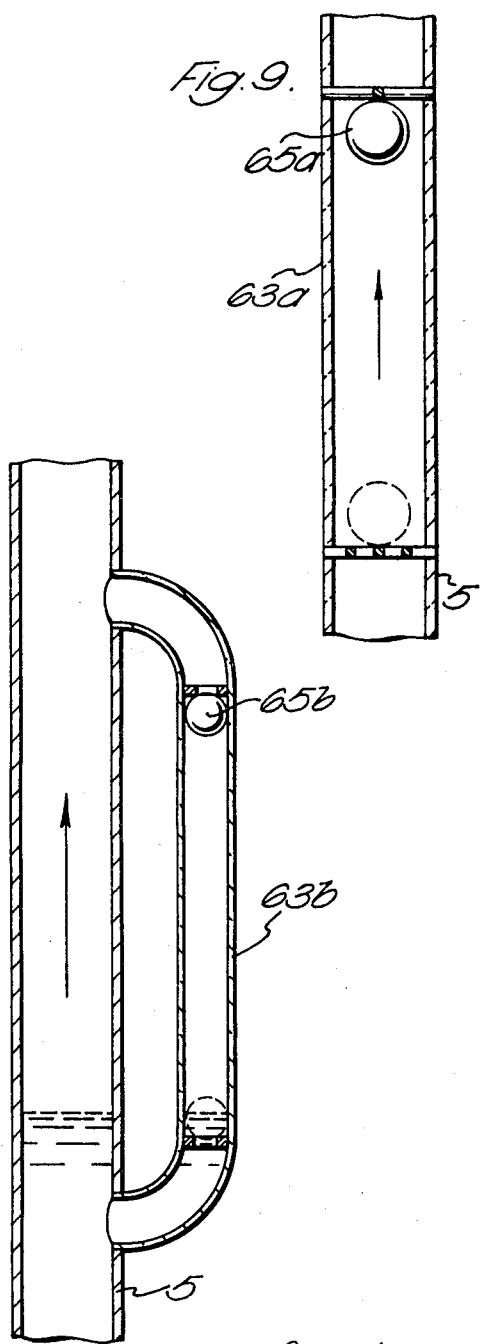

APPARATUS FOR AND METHOD OF CONTROLLING FLOW OF FLUIDS IN A PIPELINE

This invention relates to fluid control apparatus and to a method of controlling the flow of fluid and is particularly designed for controlling and minimizing the leakage from pipes or an arrangement of pipes and fittings either above or below ground and carrying a fluid under pressure. For example, in the case of underground water or gas pipes, and particularly the individual supply pipes supplying houses, factories, or other premises, leaks on such pipes or fittings are continually occuring, and these persist until located and repaired. It may take many weeks or even in some cases months before the leaks are traced and repairs are made, thus involving a constant and, over the whole period, a considerable waste of water or gas. Although this invention relates to any system of pipes for conveying a fluid, i.e. a liquid or a gas, the description which follows will be in connection with pipes for the conveyance of water.

According to the broadest aspect of this invention, we provide a method of controlling the flow of fluid in a supply pipe comprising generating a change of pressure at a tap or comparable fitting in the supply pipe by opening or closing the fitting i.e. a control valve, providing means responsive to said pressure change to cause a signal to be transmitted to a main stop cock controlling the supply of fluid to the supply pipe, and providing further means associated with said main stop cock and responsive to said signal to open or close the main stop cock, closing of the tap or comparable fitting causing the main stop cock to be closed thereby preventing the flow of fluid into the supply pipe, and opening of the tap or other comparable fitting causing the main stop cock to open and permit flow into the supply pipe.

The signals may be in the form of hydraulic or pneumatic pressure or an electrical impulse, and are always generated in response to operation of a control valve (top or comparable fitting) within the premises.

Also according to the present invention, we provide apparatus for controlling the flow of fluid in a supply pipe to a premises including a main stop cock adapted or arranged to control the flow of fluid into the supply pipe, at least one control valve for controlling flow of fluid from the supply pipe, a device to open and close the main stop cock, means responsive to flow of fluid through the control valve and means connecting the means responsive to flow of fluid through the control valve to the device to operate the device to open or close the main stop cock, in response, respectively, to flow and lack of flow through the control valve.

Preferably, the main stopcock is fluid pressure operated, and the connecting means comprises a high pressure (e.g. mains pressure) tubing connecting a pressure chamber of the main stopcock with the control valve whereupon flow of fluid through the control valve will permit a flow through the high pressure tubing, thereby releasing pressure in the pressure chamber to open the main stopcock and permit a flow in the supply pipeline and vice versa.

In one construction, each control valve e.g. a tap or ballcock in the premises is of similar construction to the main stopcock, and has a pressure chamber closed off by a diaphragm and comprise the means responsive to flow through the control valve, said pressure chambers being connected to the high pressure tubing, and the arrangement is such that when flow is permitted through a control valve, pressure is released in its respective pressure chamber, with the result that there is a drop of pressure in the high pressure tubing, thereby releasing the pressure in the pressure chamber of the main stopcock, thus opening the latter to cause a flow in the supply pipe.

The tubing preferably has a small bore.

In an alternative construction, a non-return valve is provided in the supply pipe in the premises, and the small bore tubing is connected to the supply pipe downstream of the non-return valve, the arrangement being such that flow of fluid through a control valve in the supply pipe downstream of the non-return valve will release the pressure in that part of the supply pipe which then comprises the means responsive to flow through the control valve, thereby reducing the pressure in the small bore tubing and causing a drop of pressure in the small bore tubing, said drop of pressure acting on a diaphragm in a pressure chamber in the stopcock, thereby opening the stopcock to cause flow of fluid to the supply pipe and through the non-return valve.

Also, for use with, the present invention, we provide a pressure operated stopcock comprising a casing, a main fluid inlet and a main fluid outlet from said casing, a diaphragm closing off the inlet and hence preventing flow to the outlet, one side of said diaphragm being exposed to fluid inlet (high) pressure and fluid outlet pressure and the other side of diaphragm being exposed to pressure within a pressure chamber within the casing, a high pressure fluid outlet from the pressure chamber, and a pilot aperture in the diaphragm affording communication between the inlet and the pressure chamber.

The pressure operated control valve may be a modified manual draw off tap, in which case the pilot aperture may be dispensed with. In this case, the control valve has as inlet and an outlet, a diaphragm capable of closing off the inlet preventing flow of fluid from the inlet to the outlet, an aperture in the diaphragm in registry with the outlet, a spindle screw threadedly engaging within a casing of the tap, a valve secured to the inner end of the spindle and, when the tap is closed arranged to overlie said aperture and maintain said diaphragm in a closed position, a pressure chamber on that side of the diaphragm remote from the inlet and a small bore tubing providing communication between the pressure chamber and a main pressure operated stopcock, the pressure chamber being closed off except when the diaphragm is open and flow occurs through the tap. Alternatively, the control valve may have an inlet, an outlet, a pilot apertured diaphragm for separating the inlet from the outlet, and the side of the diaphragm remote from the inlet and outlet together with part of the valve casing defining the pressure chamber, said pilot aperture affording communication between the inlet and the pressure chamber, a two way cock which in one position, releases pressure in the pressure chamber and allows the valve to open (i.e. puts the inlet in communication with the outlet) and in another position causes the chamber to be pressurized to close the valve and also to close a high pressure fluid outlet from the chamber communicating with the stopcock by a high pressure small bore tubing.

If it is desired to keep the supply pipe full of water at all times, a second fine aperture may be provided in the diaphragm of the main stopcock to permit passage of fluid.

The pressure operated main stopcock may be provided with an overriding manual control.

Preferably, a leakage indicator is provided in the premises, connected to the supply pipe.

If desired, the pressure operated stopcock may be spring assisted.

Figure 4:
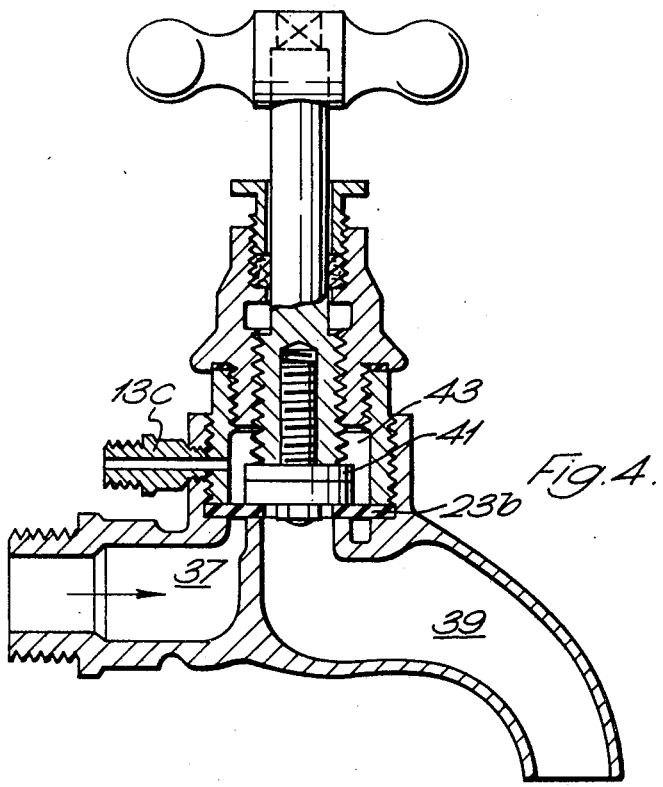
Figure 11:
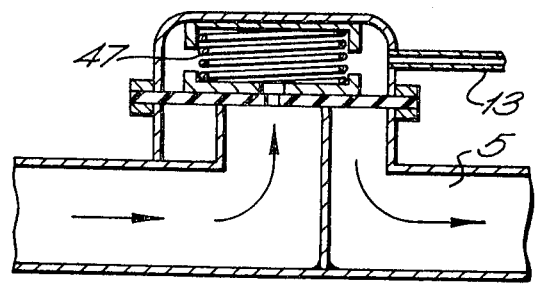
Figure 12:
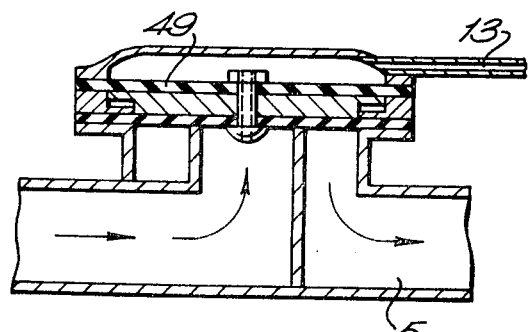
Figure 13:
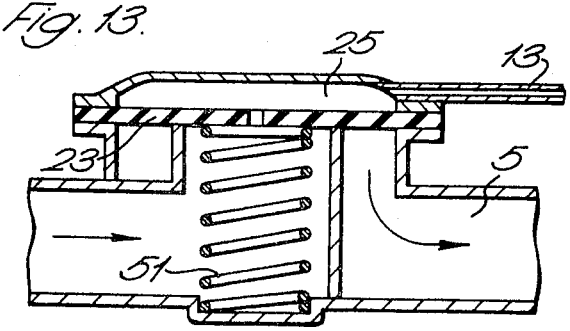

Several embodiments of the invention are now described with reference to the drawings accompanying the Provisional Specification, in which:

FIG. 1 shows schematically apparatus according to the invention in a typical domestic installation, FIG. 2 shows, to an enlarged scale, a hydraulically operated main stopcock, FIG. 3 shows schematically a typical tap used in the installation of FIG. 1, FIG. 4 shows a standard tap modified for use with the installation of FIG. 1, FIG. 5 shows the invention accommodated in an alternative installation, FIG. 6 shows a modified hydraulically operated main stop valve, FIG. 7 shows the valve of FIG. 1 modified for manual control, FIG. 8, 9 and 10 show various types of leakage indicator, and FIGS. 11, 12 and 13 show modified types of main stopcock.

Referring to FIG. 1, which shows a typical arrangement for a domestic water supply, a main hydraulic pressure operated stopcock 1 is provided to control the supply of water from a main water pipe 3, through a supply pipe 5, to domestic premises 7. Within the premises 7 there are a plurality of control valves, e.g. taps 9, and a ballcock operated valve 11. Each of the taps 9 and the valve 11 are connected to the main stopcock 1 by the supply pipe 5 and by a high pressure, small bore tubing 13 running alongside the supply pipe 5.

As can be seen from FIG. 2, the main stopcock 1 has a casing 15 and a cap 17 and water flows into the casing at 19 and out of the casing at 21 and a diaphragm 23 is stretched across the interior of the casing and sandwiched between a flange on the top of the casing and a flange on the bottom of the cap 17. The diaphragm 23 overlies the innermost end of the water inlet 19 and is biased by fluid pressure within a pressure chamber 25 to close off the water inlet 19. An outlet from the pressure chamber 25 communicates with the small bore tubing 13 and a pilot aperture 27 in the diaphragm 23 permits a limited flow of water from the inlet 19 into the chamber 25.

One of the taps 9 of FIG. 1 is shown in detail in FIG. 3 and as can be seen, with the exception of the cap and outlet is almost identical to the main stopcock 1. The tap, however, has a water outlet 21a and a modified cap 17a. The cap 17a has a central aperture 29 forming one outlet of a two way cock 31 for controlling the tap. The two way cock 31 is of standard construction and has an inlet arranged to be connected to a small bore tubing 13 and a further outlet arranged to be connected to an extension 13a of the small bore tubing. The two way cock 31 has a rotatable body of known construction provided with a handle 33. It will thus be appreciated that the tubing 13 can either be closed off by turning the handle 33 or else can be put in communication simultaneously with the aperture 29 and the extension tubing 13a which leads into the tap outlet 21a.

The ballcock operated valve 11 is a modification of the tap 9, and when the float 35 drops to cause a flow of water through the valve, water flowing into the valve 11 from the tube 13 passes into the pressure chamber 25b of the valve and into the extension tubing 13b, in the same manner as would occur by opening of the tap 9.

The above described apparatus operates as follows:

When all the taps 9 and valve 11 are turned off, water cannot flow through the small bore tubing 13. Because the tubing 13 is in communication with the water in the main pipe 3 because of the aperture 27 in the diaphragm 23 of the main stopcock 1, a build up of pressure will occur in the tube 13. Because the area of the diaphragm 23 exposed to the chamber 25 is greater than the area exposed to the water inlet 19, the diaphragm will be biased to close off the water inlet 19, thereby preventing flow of water across the end of the inlet 19 and into the outlet 21. As soon as one of the taps 9, or the ballcock 11 is opened, water can flow through the pipes 13 and out through the respective tap or valve 11, because the pressure within the pressure chamber of the tap or valve, and hence within the tube 13, and in the chamber 25 of the main stopcock, drops with the result that the pressure of the water 19 will cause the diaphragm to open and water will flow into the main supply pipe 5. Similarly, water can flow through the tap or valve 11. However, as soon as a tap 9 or the valve 11 is closed, by turning the handle 33, for example, there is a similar build up of pressure in the pressure chamber of the tap 9 and valve 11 and in the tubing 13, with the result that flow through the tap ceases because its diaphragm is biased to a closed position, and also the diaphragm 23, in the main stopcock 1 is closed because of the build up of pressure in the pressure chamber 25. This means that no more water flows into the supply pipe 5 and hence, if there was a defect in the supply pipe 5, there would be no leakage. It will be appreciated that it is necessary to provide each tap 9 or valve 11 with a hydraulically operated diaphragm, because unless the main flow through each tap was closed when the cock 31 of the tap itself was closed, opening of an adjacent tap would cause flow in the supply pipe 5, and hence flow through any other tap which was not turned off.

The tap shown in FIG. 3 may be replaced by a modified British standard bibcock such as the BS1010, which is shown in FIG. 4. The tap in FIG. 4 has a water inlet 37 and an outlet 39 and is provided with a diaphragm 23b. When the tap is closed, the diaphragm 23b is held tight over the throat of the outlet 39 by pressure applied ot it by a jumper 41. However, as soon as the tap is opened by turning the handle, the water supplied to the chamber 43 above the diaphragm 23b by means of small bore tubing connected to a suitable connection 13c can flow out of the outlet 39, thereby releasing pressure within the small bore tubing. This in turn causes the main stopcock 1 to be opened and water then flows through the supply pipe 5 and into the tap at 37 and out at 39.

It may be desired to control leakages from underground or buried sections of pipes only or in pipelines laid in inaccessible or invisible positions, in which case an installation such as that illustrated in FIG. 5 might be used. In the example shown, the main stopcock 1 is used to control flow of water in exactly the same manner as in the embodiment of FIG. 1. However, in this case, a non-return valve 45 is placed in the supply pipe 5 to isolate the inaccessible part, and the small bore tubing 13 is connected to the supply pipe 5 just downstream of the non-return valve 45. With this arrangement, any fitting, e.g. any type of tap of valve can be used in the premises, and the closing of such fittings will cause both the non-return valve 45 to shut and also the main stopcock 1 to close, thus confining leakages to times only when water is being drawn off.

If there is only a very small leak in the supply pipe 5, or if the leak occurs some distance along the service pipe 5 from the main stopcock 1, the pressure drop across the diaphragm of the main stopcock 1 will be very small, and consequently, the closing bias may be small. Hence, it is preferable that closure of the main stopcock 1 be assisted by means of a suitable compression spring 47 (see FIG. 11). Alternatively one extra diaphragm 49 of larger diameter may be provided as is shown in FIG. 12. Conversely, if it is desired to permit controlled flows to take place in the service pipe 5, control can be effected by the introduction of a coil spring 51 to assist opening of the stopcock 1 and to keep it open until the pressure drop across the diaphragm, due to flow of water from the service pipe 5 through the leak is sufficient to allow the pressure in the chamber 25 to overcome the bias of the spring 51 and close the stopcock 1. A valve of the type shown in FIG. 13 will therefore control flows up to a preset maximum corresponding to the selective pressure drop across the valve. Flows above this maximum will cause the valve to close. It will of course be appreciated that when no water is being drawn, if there is no leakage from the service pipe 5, there will be no drop of pressure across the diaphragm of the stopcock 1 and hence the diaphragm may not close completely unless a suitable spring is fitted, (see FIG. 11) but this will not normally matter because there would be no wastage of water.

If for any reason it is desired to keep the service pipe 5 full of water, yet at the same time to limit the leakage to a predetermined rate, this can be accomplished by using a diaphragm 23c with asecond aperture 53, (FIG. 6). The aperture 53 determines the rate of leakage from the service pipe 5 because when closed, the stopcock 1 still permits water to leak from the pressure chamber 25. As long as the aperture 53 is smaller than the aperture 27, the stopcock will however remain closed. It will be appreciated that a multi-apertured diaphragm could also be used.

In a similar way, by adjustment of the size of the diaphragm 23 and the aperture 27 therein, and of the bore of the high pressure tubing 13, should any of the taps 9 or valves 11 leak to a small rate, the total leakage would be confined to these small amounts and no leakage would take place from the service pipe beyond the contents of the pipe, because such small leakages would be insufficient to cause a large enough reduction of pressure in the pressure chamber 25 to open the main stopcock. The adjustment of the diaphragm apertures and of the bore of the tubing 13 may be made at any time.

The maximum pressure in the service pipe can also be controlled by the introduction of a suitable valve such as a needle valve 55 in the tubing 13, for example adjacent to where the supply pipe 5 enters the premises (FIG. 5). The closing of the needle valve 55 would immediately shut off the supply at the main stopcock 1 and therefore isolate the whole of the pipework installation. Such an installation for example could be useful in premises such as day schools which are used in the day time but not at night or during weekends. The needle valve 55 could be sited adjacent the entrance to the school so that it could be operated by the person opening and closing the school. Once the valve 55 was turned off, all taps, showers toilets etc. would be isolated until the supply was turned on by the person opening up the school. This would be particularly useful in cold weather since it would minimize frost damage and make it unnecessary at all times to check the taps and other fittings before the school was locked up besides stopping all leakages.

The stopcock shown in FIG. 1 can also be operated manually by providing a modified cap 17a (see FIG. 7) so that a turning spindle 57 and gland 59 can be mounted therein in known manner so that a suitable washer 61 on the end of the spindle 57 can be screwed down manually to close the diaphragm 23 when desired.

The above described apparatus can easily be modified to include one or more leakage indicators as shown in FIGS. 8 to 10. In the FIG. 1 installation, the leakage indicator would preferably be above ground at or near the highest point in the installation. In the FIG. 5 installation, the leakage indicator would preferably be placed at or near the non-return valve 45, on the upstream side. The leakage indicator shown in FIG. 8 consists of a sight glass 63 made for example of glass or perspex with or without a small float 65 of plastics or other suitable light weight substance. A small air release valve 67 is provided above the sight glass.

In the installations of FIGS. 1 and 5, when no water is being drawn from the premises, the main stopcock 1 is automatically in the closed position and if there is a leakage in the service pipe 5 between the stopcock 1 and the leakage indicator, water will drain out and the water level in the indicator will drop and disappear. By calibrating the sight glass 63 and timing the falling water level, the rate of leakage from the pipe can be determined. Alternative forms of indicator are shown in FIGS. 9 and 10 and like parts bear similar reference characters followed by the lower case letters a and b. In both the constructions of FIGS. 9 and 10, no air release is necessary. The leakage indicator, instead of having a sight glass could be modified to give a visual or audible indication of a leak such as by means of a flashing light or an alarm sounding.

Where a leakage indicator is fitted, the absence of an alarm signal or visual indication of a leak does not necessarily mean that there is no a leak upstream of the leak age indicator, because there could be a leak in the premises supplied downstream of the indicator e.g. by dripping taps or defective fittings or pipework, which would produce a flow through the indicator so that it did not indicate the leak. This would only occur if the leak downstream of the indicator was sufficiently large for there to be a material reduction of pressure in the pressure chamber of the main stopcock 1. This would cause a reduction in the small bore tubing 13, with a resultant drop in pressure in the chamber 25 thus causing the main stopcock to open and thereby causing a flow in the service pipe, with the result that the leakage indicator would not indicate a leak. This can be tested by fitting a control cock such as the valve 55 in the small bore tubing within the premises, upstream of the fittings in the premises. By closing the valve 55, a build-up of pressure will occur in the small bore tubing 13 so as to close off the main stopcock 1. This will then mean that flow in the main service pipe 5 will cease and the leakage indicator will indicate whether or not there is a leak.

One advantage of this invention is when it is used with plastics and other types of non-metallic supply pipes, where it would not be possible for electrical devices to be used to trace exactly where the pipes are buried underground. Should buried non-metallic supply pipes be frozen up, the use of metal small bore tubing 13 will enable the pipe 5 to be thawed out by electrical means, provided the small bore tubing 13 is laid in close proximity to the supply pipe 5. By passing an electric current through the tubing 13, the heat generated could thaw out the pipe 5.

It is not essential however, that the tubing 13 is metallic.

The tubing 13 may vary from about 1/32nd inch bore upwards and will generally be suitable for a working pressure of not less than 5,000 pounds per square inch, although lower strength tubing could be used if desired since the strength of the tubing does not effect in any way the operation of the system. Usually, the tubing 13 would have a life many times that of the service pipe 5. Normally the tube 13 would be attached to the pipe 5.

It is possible to adapt the invention for electrical operation, for example the main stopcock 1 could be operated by means of a solenoid. Each of the taps 9 or valves 11 would then be fitted with a device responsive to opening and closing of the tap or valve, and on closing of the tap or valve, a signal from the device would be sent by means of a suitable circuit to the solenoid to close the main stopcock 1. Obviously the electrical circuit would have to be operated by a suitable safe voltage but it would easily be used with the installations of either FIG. 1 or FIG. 5.

Usually draw off taps and ball valves in ordinary domestic premises are used on average for less than 5 percent of the 24 hours in any 1 day and therefore the use of this invention will, it is claimed, save approximately 95 percent on average of the whole of the water lost by leakage from supply pipes both above and below ground. By reducing shock and water hammer, the use of the invention will diminish the number of leakages and thus further reduce the total leakage from supply pipes and pipework installations.

It will be appreciated that the pipe 5 and tubing 13, could be arranged one within the other or even concentrically or manufactured in one piece side-by-side.

It is envisaged that a combination of hydraulic and electrically operation could be used in which case the solenoid operated main stopcock would still be opened by a change in pressure.

What is claimed is:

1. A method of controlling the flow of fluid in a supply pipe of a system including a main stopcock for controlling fluid flow into the supply pipe and a control valve remote from the main stopcock through which fluid is discharged from the supply pipe, said method comprising the steps of bleeding off a portion of said fluid and generating a change of pressure at the control valve by selectively opening and closing the control valve, providing means responsive to the pressure change of said bled-off fluid to cause a signal to be transmitted to the main stopcock, and providing further means associated with said main stop-cock and responsive to said signal to open and close the main stopcock, the relationship between the control valve and the main stopcock being one wherein closing of the control valve causes the main stopcock to be closed thereby preventing the flow of fluid into the supply pipe, and opening of the control valve causes the main stopcock to open and permit flow into the supply pipe and then through the control valve.

2. A method according to claim 1, in which the signals are in the form of fluid pressure impulses.

3. A method according to claim 2, in which the signals comprise electrical impulses.

4. Apparatus for controlling the flow of fluid in a supply pipe to a premises including a main stopcock means for controlling the flow of fluid into the supply pipe, at least one control valve means for controlling flow of fluid from the supply pipe, said control valve means being of the type receiving and having passed therethrough the fluid to be discharged from the supply pipe, a device for opening and closing the main stopcock means, control means of which at least a portion is disposed within said control valve means for generating a build-up of pressure of said fluid therein when there is no flow of said fluid through the control valve, and connecting means connecting the control means to the device to operate the device to open and close the main stopcock means, dependent, respectively, upon flow and lack of flow of fluid from said supply pipe through the control valve means.

5. Apparatus according to claim 4, in which said device is fluid pressure operated and includes a pressure chamber, and the connecting means comprises a high pressure tubing connecting said pressure chamber with the control means in a manner wherein flow of fluid through the control means will permit flow through the high pressure tubing releasing pressure in the pressure chamber with the device opening the main stopcock means and permitting a flow into the supply pipe and vice versa.

6. Apparatus according to claim 4, in which said control means includes a non-return valve in the supply pipe in the premises, said device includes a diaphragm, and a pressure chamber acting on said diaphragm, and said connecting means includes small bore tubing connected to said pressure chamber and to the supply pipe downstream of the non-return valve, the arrangement being such that flow of fluid to one control valve means in the supply pipe downstream of the non-return valve will release the pressure of said fluid in that part of the supply pipe thereby reducing the pressure in the small bore tuving and causing a drop of pressure in the small bore tubing with said drop of pressure acting on said diaphragm opening the main stopcock means to cause flow of fluid to the supply pipe and through the non-return valve.

7. Apparatus according to claim 4, in which at least one of the control valve means comprises a modified tap including a casing having an inlet and an outlet, a diaphragm in said casing capable of closing off the inlet preventing flow of fluid from the inlet to the outlet, an aperture in the diaphragm in registry with the outlet, a spindle screw threadedly engaging within said casing, a valve forming part of said control means and secured to the inner end of the spindle and, when the tap is closed, arranged to overlie said aperture and maintain said diaphragm in a closed position, said control means including a pressure chamber on that side of the diaphragm remote from the inlet, and said connecting means including a small bore tubing providing communication between the pressure chamber and said main stopcock means, the pressure chamber being closed off except when the diaphragm is open and flow occurs through the tap.

8. Apparatus according to claim 4, in which an overriding manual control is provided on the pressure operated main stopcock means.

9. Apparatus according to claim 4, in which a leakage indicator is provided in the premises, connected to the supply pipe.

10. Apparatus according to claim 4, including a spring to assist said device in opening said main stopcock means.

11. Apparatus according to claim 4, in which each control valve means and the main stopcock means are of similar construction with each having a pressure chamber closed off by a diaphragm, and said pressure chamber and diaphragm of said main stopcock means forming parts of said device, said connecting means including high pressure tubing connecting said pressure chambers, and the arrangement being that when flow is permitted through one control valve means pressure is released in its respective pressure chamber with the result that there is a drop of pressure in the high pressure tubing thereby releasing the pressure in the pressure chamber of the main stopcock means with said device opening said main stopcock means to cause a flow into the supply pipe.

12. Apparatus according to claim 11, in which said tubing has a small bore.

13. Apparatus according to claim 11, in which the control valve means includes a casing having an inlet and an outlet, said control valve means diaphragm being a pilot apertured diaphragm for separating the inlet from the outlet, and the side of the diaphragm remote from the inlet and outlet together with part of the valve casing defining the pressure chamber of said control valve means, said pilot aperture affording communication between the inlet and the pressure chamber of said control valve means, said control means including a two way cock which in one position, releases pressure in the pressure chamber of said control valve means and allows the control valve means to open putting the inlet in communication with the outlet and in another position causes the pressure chamber of said control valve means to be pressurized to close the control valve means and also to close the pressure chamber of the control valve means from communicating with the high pressure tubing.

14. Apparatus according to claim 13, in which a second aperture is provided in the diaphragm of the main stopcock means to permit controlled passage of fluid therethrough.

15. Apparatus according to claim 4, in which the pressure operated main stopcock means comprises a casing, a main fluid inlet and a main fluid outlet from said casing, said device includes a diaphragm for closing off the inlet and hence preventing flow to the outlet, one side of said diaphragm being exposed to fluid inlet pressure and fluid outlet pressure and the otherside of the diaphragm being exposed to pressure within a pressure chamber within the casing, said connecting means including a high pressure fluid outlet from the pressure chamber, and a pilot aperture in the diaphragm affording communication between the inlet and the pressure chamber.

16. Apparatus according to claim 15, in which the main stopcock means is manually operable and includes a spindle whereby the pressure chamber may be opened and closed.

* * * * *